Oct. 30, 1934.     J. E. JONES     1,978,999
TRANSMISSION HOIST
Original Filed April 28, 1931
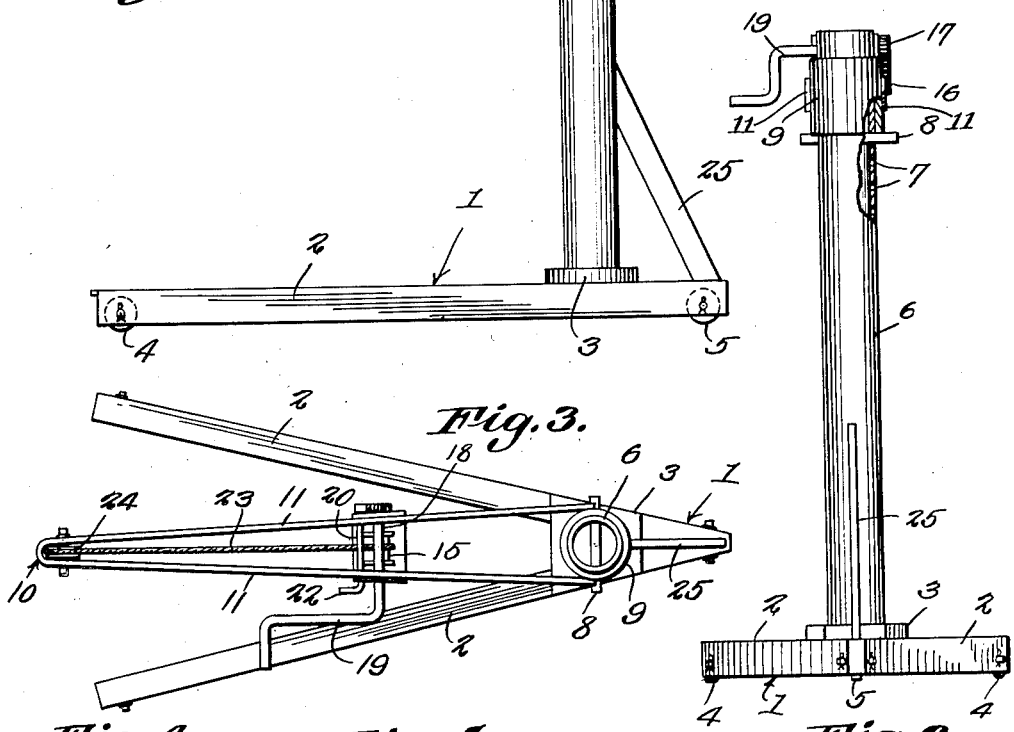

Patented Oct. 30, 1934

1,978,999

UNITED STATES PATENT OFFICE 1,978,999

TRANSMISSION HOIST

James Edward Jones, Dallas, Tex., assignor of one-half to Alexander D. McNabb, Dallas, Tex.

Application April 28, 1931, Serial No. 533,494
Renewed March 26, 1934

1 Claim. (Cl. 254—139.1)

This invention aims to provide a simple means whereby one man can hoist a transmission out of an automobile and replace the transmission in the automobile. A mechanic can make changes in the structure shown, within the scope of what is claimed, without departing from the spirit of the invention.

Figure 1 is a side elevation,

Figure 2 is an end elevation with parts broken away,

Figure 3 is a top plan,

Figure 4 is a side elevation of the bracket which carries some of the operating mechanism, Figure 5 is a cross section of the bracket.

The machine includes a base 1 which is V-shaped in top plan, the base comprising side bars 2 joined together at the apex of the base by a platform 3. There are castors 4 at the ends of the bars 2, and a castor 5 at the apex formed by the bars 2, the castors facilitating the movement of the base on the floor.

A vertical post 6 is securely mounted on the platform 3 and is sustained by an inclined brace 25 from the point of the base 1. The post 6 may be a strong piece of pipe: in any event, it is circular, so that a collar 9 can rotate horizontally upon it, for adjustment, the collar being carried by a support 8, in the form of a pin, which may be inserted through holes or seats 7 formed in a vertical line along the post 6 near to its upper end, a vertical adjustment of the collar 9 thus being provided for. A horizontal arm 10 has its inner end connected securely and firmly to the collar 9. In top plan, the arm 10 may be V-shaped, as shown in Figure 3, and it comprises spaced members 11. A U-shaped bracket 12 encloses the spaced members 11 of the arm 10 and is located intermediate the ends of the arm, the bracket being held in place on the arm by securing elements 26. In the bracket 12, a first horizontal shaft 14 is journaled for rotation. A drum 15 is secured to the shaft 14 and is located between the side portions of the bracket 12, as Figure 5 will show. On one end of the shaft 14 there is a gear wheel 16 meshing with a pinion 17 secured to the end of a shaft 18, journaled in the bracket 12, and provided with a crank 19. A third shaft 20 is located a little below the second shaft 18 and is mounted to rock in the side arms of the bracket 12. On one end, the shaft 20 carries a pawl 21, adapted to engage the pinion 17. On the opposite end of the shaft 20 there is a handle 22. A flexible element 23 is wound about the drum 15 and is extended longitudinally of the arm 10, and downwardly about a pulley 24 on the outer end of the arm.

In practical operation, the side doors of the automobile are opened, and the machine is slid along until the base 1 is under the auto, the arm 10 entering the automobile through one of the opened doors, the depending end of the flexible element 23 being located immediately above the transmission. The transmission is made fast to the depending end of the flexible element 23, and a person sitting on the front seat of the auto, can rotate the shaft 18 by means of the crank 19, the pinion 17 and the gear wheel 16 imparting rotation to the shaft 14, the flexible element 23 being reeled upon the drum 15, and the transmission being hoisted accordingly. The shaft 20 can be rocked by means of the handle 19, to engage the pawl 21 with the pinion 17, and, thus, the transmission will be held elevated, retrograde rotation of the drum 15 being prevented.

The operator then can slide the entire device clear of the auto, carrying away the transmission which has been hoisted out of the car. The operation of replacing the transmission amounts merely to the reversal of the process hereinbefore described.

The machine is simple in construction, easy to build, and not likely to get out of order. By it, a single man can hoist a transmission out of a car and lower the transmission into the car, without difficulty, time and labor being saved.

Having thus described the invention, what is claimed is:

A device for lifting a transmission out of a motor car, embodying a base, a vertical post mounted on the base, a horizontal arm on the post and overhanging the base, a hand-operated windlass on the arm, a flexible element connected to the windlass, and means for guiding the flexible element downwardly from the outer end of the arm to form a vertical part, from which the transmission is suspended: the device being characterized by the following features, the windlass being mounted on the arm in spaced relation to the post, whereby when the post is outside the motor car, the windlass will be inside the motor car, the windlass being near enough to the vertical part of the flexible element so that a person occupying the seat of the motor car and looking downwardly along the vertical part of the flexible element, to guide the transmission as it rises, can reach the windlass and operate the same, and the arm tapering from the post to said means, whereby the operator may sit, in the motor car, in a place which will enable him to look downwardly along the vertical part of the flexible element, as aforesaid.

JAMES EDWARD JONES.